United States Patent [19]

Djabbarah et al.

[11] Patent Number: 5,542,474
[45] Date of Patent: Aug. 6, 1996

[54] FOAM MIXTURE FOR CARBON DIOXIDE DRIVE OIL RECOVERY METHOD

[75] Inventors: Nizar F. Djabbarah, Richardson; Ralph V. Garling, Irving, both of Tex.; David T. Hand; Jennifer Macfadyen, both of Bakersfield, Calif.

[73] Assignee: Mobil Oil Corporation, Fairfax, Va.

[21] Appl. No.: 566,636

[22] Filed: Dec. 4, 1995

Related U.S. Application Data

[62] Division of Ser. No. 438,584, May 10, 1995, Pat. No. 5,513,705.

[51] Int. Cl.⁶ ............................................. E21B 43/22
[52] U.S. Cl. ......................... 166/263; 166/273; 166/274; 166/309; 507/202
[58] Field of Search ................................. 166/263, 268, 166/273, 274, 275, 305.1, 309; 507/202, 244, 251, 259

[56] References Cited

U.S. PATENT DOCUMENTS

| | | | |
|---|---|---|---|
| 4,306,982 | 12/1981 | Bloom | 166/275 X |
| 4,577,688 | 3/1986 | Gassmann et al. | 166/263 X |
| 4,612,991 | 9/1986 | Shaw | 166/273 |
| 4,703,797 | 11/1987 | Djabbarah | 166/273 X |
| 5,295,540 | 3/1994 | Djabbarah et al. | 166/268 X |

Primary Examiner—George A. Suchfield
Attorney, Agent, or Firm—Ronald A. Bleeker; Malcolm D. Keen; Lawrence O. Miller

[57] ABSTRACT

The invention is a foam method for improving conformance during a steam flood or carbon dioxide flood in a subterranean, oil-containing formation penetrated by at least one injection well and at least one production well. In a steam flood oil recovery process, sweep efficiency is improved by injecting steam until steam breakthrough occurs at the production well after which a mixture of steam, a noncondensible gas, and an aqueous surfactant-polypeptide solution is injected into the formation. The aqueous surfactant-polypeptide solution forms a stable foam with the formation oil at formation conditions that reduce the permeability of the highly permeable steam swept zones thereby diverting the steam to other portions of the formation containing unswept oil. The polypeptide is used as a partial substitute for the surfactant to improve the cost of the foam-forming mixture without reducing its effectiveness in increasing sweep efficiency. In another embodiment of the invention, the mixture of steam, surfactant-polypeptide solution and noncondensible gas may be injected into the formation surrounding a production well that has previously experienced severe steam breakthrough to significantly decrease the permeability of steam-swept zone surrounding the production well.

22 Claims, 3 Drawing Sheets

FOAM MIXTURE FOR CARBON DIOXIDE DRIVE OIL RECOVERY METHOD

This is division of application Ser. No. 08/438,584, filed on May 10, 1995, now U.S. Pat. No. 5,513,705.

FIELD OF THE INVENTION

This invention relates to an oil recovery process such as steam or carbon dioxide flooding for oil-containing formations in which the sweep efficiency of the steam or carbon dioxide is improved significantly by generating a foam using an aqueous surfactant-polypeptide solution as the foaming agent that produces a more stable foam in the steam or carbon dioxide swept zone in the formation that reduces the permeability of the steam or carbon dioxide swept zone thereby enabling subsequently injected steam or carbon dioxide to migrate into additional portions of the formation containing unswept oil.

BACKGROUND OF THE INVENTION

The injection of steam to recover oil from heavy oil formations is an accepted method in the industry and accounts for nearly 80% of total U.S. enhanced oil recovery. Past experiments and field performance have shown the improved displacement efficiency of heavy oils by reduction in viscosity of the oil by a heated displacing phase. Displacement of oil increases with increasing temperature. Despite its success, it typically leaves behind 30-40% of the original oil in place. One reason is reservoir heterogenieties which, together with relatively low density and viscosity of steam, causes rapid communication between injector and producer wells. The result is reduced sweep efficiency and lower oil recovery.

Steam is considerably lighter than the oil and water present in the formation and thus, because of gravity segregation, it tends to rise to the top of the formation when vertical communication exists. Consequently, the injected steam channels through the top of the formation to the producing well overriding a major portion of the formation and contacting only a small fraction of the formation oil. Once steam breakthrough occurs, steamflood efficiency is reduced. This behavior results in an inefficient oil recovery and low vertical sweep efficiency.

A similar conformance problem exists with carbon dioxide flooding. Carbon dioxide has a great tendency to channel through oil-in-place since carbon dioxide viscosity may be 10 to 50 times lower than the viscosity of the oil-in-place.

Laboratory and field test results have demonstrated that foam may be used to improve sweep efficiency. In steamflooding, the process is referred to as steamfoam. A typical steamfoam process involves coinjection of a small amount of surfactant with steam or with a noncondensible gas, such as nitrogen and steam. The steam vapor, or the nitrogen and the steam vapor disperses in the surfactant solution and generates foam. Because of its gas-like density, foam tends to override the steam and enter the more permeable and the well swept zones. Because of its high viscosity, it flows at a slower rate and allows steam to be diverted to the unswept zones with high oil saturation. The diverted steam contacts the oil and recovers it. A typical steamfoam process involves the injection of 0.2-1% by weight surfactant in the liquid phase and 0.1-2 mole percent nitrogen in the gas phase.

In addition, numerous patents have been issued on the recovery of oil using a foam-forming mixture of steam, noncondensible gas and surfactant which includes U.S. Pat. Nos. 4,086,964; 4,488,598; 4,570,711; 4,852,653 and 4,971,150.

U.S. Pat. No. 4,607,695 discloses a steamfoam process in which steam is injected into the formation having a natural brine salinity concentration within the range of 10 to 20% by weight until steam breakthrough occurs at the production well after which a mixture of steam, a noncondensible gas, and a surfactant comprising a $C_{12}$ alpha olefin sulfonate is injected into the formation. The $C_{12}$ alpha olefin sulfonate forms a stable foam with the formation oil at formation conditions that reduces the permeability of the highly permeable steam swept zones thereby diverting the steam to other portions of the formation containing unswept oil.

U.S. Pat. No. 5,295,540 to Djabbarah et al. discloses a steam foam oil recovery process wherein sweep efficiency is improved by injecting steam until steam breakthrough occurs at the production well after which a mixture of steam, a noncondensible gas, and an aqueous surfactant-starch solution is injected into the formation.

The present invention provides an improved method for recovering oil from an oil-containing formation utilizing an aqueous surfactant-polypeptide solution mixed with carbon dioxide or with steam and a noncondensible gas that stabilizes the foam effecting a reduction in permeability of steam-swept or carbon dioxide-swept channels thereby enabling subsequently injected steam or carbon dioxide to migrate into additional portions of the formation containing unswept oil. The use of an aqueous mixture of surfactant and polypeptide as the foam-forming mixture produces a stable foam and also results in a reduced amount of surfactant without reducing the effectiveness of the surfactant.

The polypeptide used in the present invention is easier to handle at field conditions than the starch disclosed in U.S. Pat. No. 5,295,540 above since it does not separate like starch, is more thermally stable and generates stronger foam at the same concentrations.

SUMMARY

The present invention relates to a steam or carbon dioxide flooding method for recovering oil from a subterranean, oil-containing formation penetrated by at least one injection well and at least one spaced-apart production well, said wells being in fluid communication with a substantial portion of the formation. In the case of steamflooding, steam is injected into the formation and fluids including oil are produced from the formation via the production well for a predetermined period of time, preferably until the establishment of thermal communication between the injector and the producers. Thereafter, a mixture of steam, a noncondensible gas, and an aqueous solution of surfactant-polypeptide is injected into the formation via the injection well, said aqueous surfactant-polypeptide solution capable of forming a stable foam with residual oil in the steam-swept zone at formation conditions of temperature and pressure thereby significantly decreasing the permeability of that zone and diverting the steam into other portions of the formation and continuing to inject said mixture of steam and aqueous surfactant-polypeptide and recovering fluids including oil from the formation solution via the production well. The noncondensible gas and aqueous surfactant-polypeptide solution may be injected into the formation without the concurrent injection of steam provided that steam is injected into the formation prior to and after the injection of the noncondensible gas and aqueous surfactant-polypeptide solution. In still another embodiment, it may be desirable to inject alternate slugs of (1) steam, (2) mixtures of aqueous surfactant-polypeptide solution and noncondensible gas and (3) steam in WAG cycles. In the case of carbon dioxide flooding, the flooding medium itself preferably doubles as the non-condensable gas.

In another embodiment of the invention, the mixture of steam, aqueous surfactant-polypeptide solution and noncondensible gas may be injected into the formation surrounding a production well that has previously experienced severe steam breakthrough to significantly decrease the permeability of steam-swept zone surrounding the production well.

DESCRIPTION OF THE PREFERRED EMBODIMENTS

The process of our invention concerns an improvement in a steam or gas flooding type of oil recovery method in a subterranean, oil-containing formation using an aqueous surfactant/polypeptide foaming agent. In a steamflood, the method involves injecting a mixture of steam, a noncondensible gas, and an aqueous surfactant-polypeptide solution that forms a stable foam in the steam-swept channels of the formation at formation conditions of temperature and pressure thereby plugging the previously steam-swept channels so that the injected steam will be forced to pass through unswept oil sections of the formation. The presence of the low cost polypeptide in the foam-forming mixture improves stabilization of the foam and also reduces the amount of high cost surfactant required in the solution without reducing the effectiveness of the surfactant thereby resulting in a more economical process.

Figure 1:
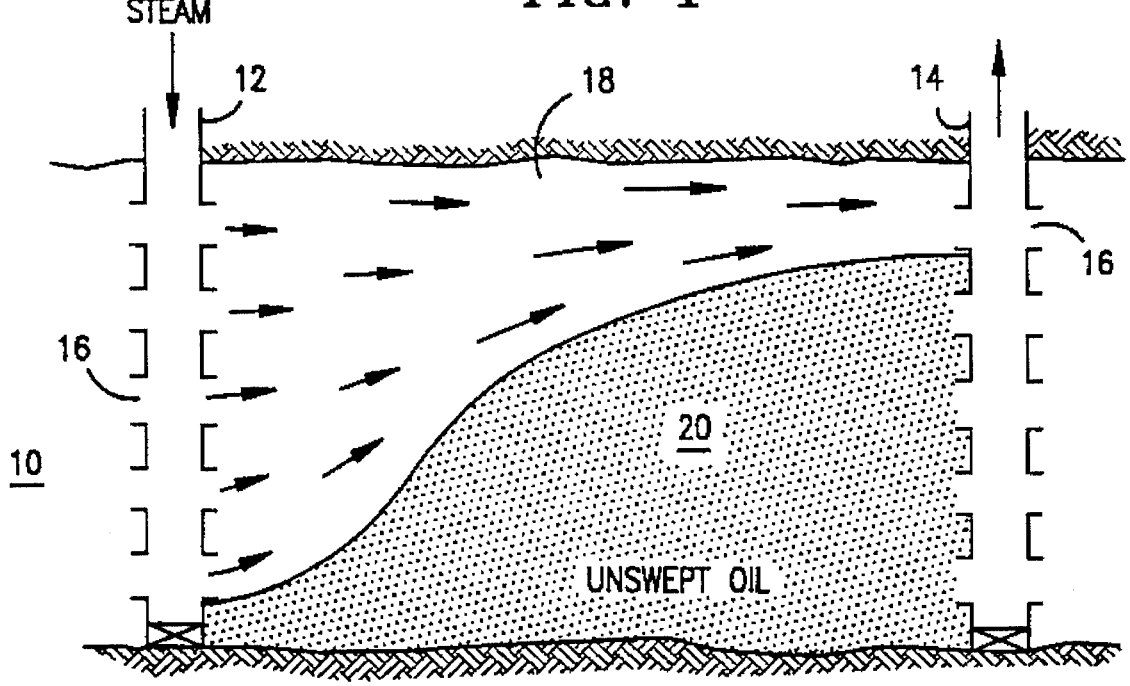
FIG. 1 illustrates a vertical plan view of a subterranean, oil-containing formation penetrated by an injection well and a production well completed subsequently throughout the formation, illustrating how initial injection of steam migrates to the upper portions of the formation, thus overriding and bypassing a significant amount of oil in the lowest portion of the formation.

The process of our invention is best understood by referring to the attached figures, in which FIG. 1 illustrates how an oil-containing formation 10 is penetrated by an injection well 12 and a production well 14. When using steam flooding, steam is initially injected into injection well 12, passes through perforations 16, and then into the formation 10. Conventional practice is to perforate or establish fluid flow communications between the well and the formation throughout the full vertical thickness of the formation, both with respect to injection well 12 and production well 14. The injected steam heats the oil reducing its viscosity and displaces the mobilized oil through the formation 10 toward production well 14 from which it is recovered. Although steam is injected in the full vertical thickness of the formation, it can be seen that steam migrates both horizontally and in an upward direction as it moves through the formation between injection well 12 and production well 14. Once a portion of the formation 18 has been swept by steam passing horizontally through the formation to at least one of the zones of producing well 14, the problem of premature steam breakthrough is recognized. Since the hydrocarbons have been removed from the portions of the pore spaces of swept zone 18, the permeability to steam is much greater in zone 18 than it is in the lower undepleted portion 20 of the formation 10. Once the high permeability swept zone 18 has been established connecting injection well 12 and production well 14, further injection of steam into the formation will result in steam passing only through zone 18 and consequently displacing very little additional viscous oil from that portion 20 of the formation through which very little of the steam passes causing the overall recovery efficiency from the extra recovery zone to be very low. Referring to FIG. 1, the portion 18 of the first step represents an ever decreasing portion of the vertical thickness of the formation as the steam travels between the injection well 12 and production well 14.

Figure 2:
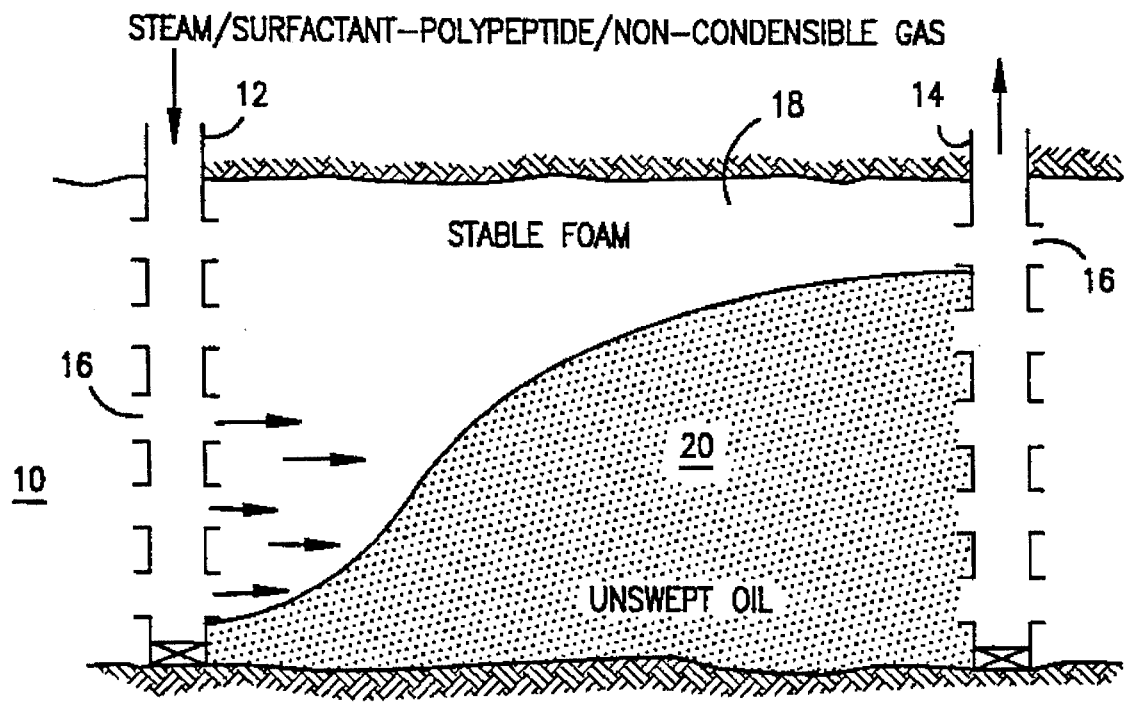
FIG. 2 illustrates the second step of our process wherein a mixture of steam, a noncondensible gas and an aqueous surfactant-polypeptide solution is injected into the steam-swept zone that forms a stable foam under formation conditions of temperature and pressure thereby decreasing the permeability of that zone and causing the injected steam to migrate into the portions of the formation containing unswept oil.

The second step in the process of our invention is initiated once thermal communication has been established between the injection well 12 and the production well 14 after which a mixture of steam, a noncondensible gas, and an aqueous surfactant solution containing polypeptide is injected into the formation via injection well 12 and fluids including oil are continued to be recovered from the formation 10 via production well 14 as illustrated in FIG. 2. Polypeptide is a low molecular weight protein. The noncondensible gas is preferably nitrogen, but can comprise other gases such as air, $CO_2$, flue gas, natural gas, methane, ethane, carbon monoxide or any mixture thereof. The surfactant used in this invention is a water-soluble anionic surfactant. The surfactants useful in the steamfoam application of the present invention include alkylaryl, alpha olefin sulfonates (AOS), dimerized alpha olefin, linear toluene sulfonates and the petroleum sulfonates derived from sulfonation of petroleum oils or petroleum oil fractions. Normally linear toluene sulfonates will be preferred in a steamfoam process since they are chemically stable at steamflood conditions. Useful commercially available steamfoam surfactants include those sold under the trade name "STEPANFLO 80" sold by Stepan Chemical Company, "SIPONAATE A-168" sold by Alcola International, Inc., "ENORDET AOS 1618" sold by Shell Chemical Company and "CHASER SD1020" sold by Chaser International Inc., Marina del Ray, Calif. 90292. The most preferred surfactant is "CHASER SD1020", having an average activity of 10 lb/lb.

The surfactants useful in the non-thermal (without steam) gas-drive application of this invention include anionic surfactants such as lower chain-length alpha olefin sulfonates ($C_6$–$C_{14}$) and ammonium or sodium salts of ethoxylated sulfated alcohols and nonionic surfactants such as linear alcohol ethoxylates, which are the products of the reaction of a linear alcohol with ethylene oxide. The most preferred surfactant in the gas-driven application is an ammonium salt of ethoxylated sulfated alcohol marketed by GAF Corporation under the trade name "ALIPAL CD-128".

The polypeptide is mixed with an aqueous surfactant solution with various activity. The aqueous surfactant solution and polypeptide are mixed until the polypeptide is dissolved. The concentration of surfactant in the aqueous solution can vary from 0.1 wt. % active surfactant to 5 wt.

% active surfactant. The aqueous surfactant-polypeptide solution is coinjected with the steam and noncondensible gas. The weight ratio of surfactant to polypeptide is about 1:10 to 10:1, preferably about 1:1, depending on reservoir properties and process economics. The foaming mixture contains about 20 to about 100, preferably about 40 to about 60 standard cubic feet of a non-condensible gas per barrel of steam (cold water equivalent). The concentration of surfactant in the mixture of steam, noncondensible gas and aqueous surfactant-polypeptide solution is about 0.1% to about 5%, preferably about 1.0% by weight of the liquid phase of the steam (cold water equivalent). The concentration of the noncondensible gas in the steam vapor is about 0.1 to 6 cu. ft./100 cu. ft. steam vapor, preferably 1 cu. ft./10 cu. ft.

As used in the specification and appended claims the term "polypeptide" refers to polymers of amino acid units bounded by means of amine linkages. The average molecular weight of a polypeptide is less than 10,000. Those with higher molecular are proteins. A detailed description of polypeptides, their structure, and their properties is given in organic chemistry textbooks such as Organic Chemistry by T. W. Graham Solomons (pages 957 through 973, John Wiley and Sons, NYC, N.Y., 1976) and references such as Encyclopedia of Polymer Science and Engineering edited by Mark, Bikales, Overberger and Menges (Second Edition, Volume 12, pages 786 through 858), John Wiley and Sons, NYC, N.Y., 1988). These references are hereby incorporated by reference herein. In this invention vegetable-based polypeptides are preferred. Examples include soybean, wheat, rice, and pea polypeptides. The most preferred polypeptide is soybean polypeptide. Soybean polypeptides are marketed by Maybrook, Inc. (Lawrence, Mass. 01842) as "Soy-Tein NL" or "Polypeptide 10" and by Protein Technologies International (St. Louis, Mo. 63164) as "RPX 4505", "PRO-COTE 5000", and "SP 2500". The most preferred polypeptide is polypeptide 10 having a density of 9.18 lb./gal.

Referring to FIG. 2, the injected mixture of steam, noncondensible gas and aqueous surfactant-polypeptide solution passes into the steam swept zone 18 and as the aqueous surfactant-polypeptide solution is displaced through the steam swept zone 18 it creates a stable foam in that portion of the formation that significantly decreases the permeability of that zone. The presence of polypeptide in the injected aqueous surfactant-polypeptide solution stabilizes the foam films (lamellae), reduces the tendency of the film to rupture, increases flow resistance, and diverts the steam into zone 20 of the formation containing unswept oil. The polypeptide and surfactant absorb at the surface of the foam films where they form molecular complexes and render the foam lamellae more stable. As the foam propagates in the reservoir, the polypeptide is preferentially adsorbed on the rock surface, thereby reducing surfactant loss due to adsorption thereby allowing more surfactant to propagate further into the formation to increase flow resistant in the steam swept zones. The low cost polypeptide acts as a preferential or sacrificial agent therefore making the process more economical by reducing the amount of high cost surfactant required in the foam-forming mixture without reducing the effectiveness of the surfactant. For example, surfactants currently costs about $1.75–$2.00 per active pound whereas polypeptide only costs about $0.75–$0.80 per pound.

The injection rate of the mixture of steam, noncondensible gas and aqueous surfactant/polypeptide solution depends on the design of the original steam flood. For an 80–100 foot thick reservoir zone, typical injection rates are 650 barrels of steam per day, on a cold water equivalent basis, 17 gallons/hr of aqueous surfactant-polypeptide solution and 20 standard cubic feet per minute of noncondensible gas such as nitrogen.

Continued injection of the mixture of steam, noncondensible gas, and surfactant-polypeptide mixture results in additional formation of the stable foam that selectively decreases the permeability of the high permeability steam swept zone thereby causing steam to pass into zone 20 in the lower portion of the formation below zone 18 containing unswept oil which increases the vertical thickness of the formation swept by steam. Injection of the steam-gas-surfactant-polypeptide mixture and production of oil is continued until steam breakthrough occurs as the production well 14 or until the water cut of the fluid being produced reaches an unfavorable value, preferably at least 95 percent.

In another embodiment of the process of our invention, the noncondensible gas and aqueous surfactant-polypeptide solution may be injected into the formation without the concurrent injection of steam, provided that steam is injected into the formation prior to and after the injection of the noncondensible gas and aqueous surfactant-polypeptide solution. In this embodiment 15–40 gallons of aqueous surfactant-polypeptide solution per 100 SCF of noncondensible gas is injected into the formation and the weight ratio of surfactant to polypeptide is about 10:1 to 1:10, preferably about 1:1, depending on reservoir properties and process economics.

In still another embodiment it may be desirable to inject alternate slugs of aqueous surfactant-polypeptide solution and noncondensible gas in WAG cycles into the formation without the concurrent injection of steam, provided that steam is injected into the formation prior to and after the injection of the noncondensible gas and aqueous surfactant-polypeptide solution. But preferably, the steam is coinjected with the noncondensible gas and aqueous surfactant-polypeptide solution.

In accordance with the invention, the temperature of the injected steam is maintained about 400° F., and preferably at temperatures in the range of 400°–500° F. The quality of the steam is within the range of 40 to 80%.

In still another embodiment, it may be desirable to inject the aqueous surfactant-polypeptide solution and noncondensible gas mixture into a production well that has experienced severe steam or gas breakthrough to reduce the high permeability swept zone surrounding the production well. In this embodiment steam may also be injected concurrent with, prior to or after the injection of the aqueous surfactant-polypeptide solution and noncondensible gas into the production well. If the aqueous surfactant-polypeptide solution is coinjected with steam, then the concentration of the surfactant in the mixture of steam, noncondensible gas and aqueous surfactant-polypeptide solution is about 0.1% to about 5%, preferably about 1% by weight of the liquid phase of the steam/cold water equivalent, depending on reservoir properties and process economics and the weight ratio of surfactant to polypeptide is about 1:10 to 10:1, preferably about 1:1. The concentration of the noncondensible gas in the steam vapor is about 0.1 to 5 cu. ft. gas/100 cu. ft. steam vapor, preferably 1 cu. ft. gas/10 cu. ft. After the production well has been treated, the well is returned to production of oil. After the injection of the steam, aqueous surfactant-polypeptides solution and noncondensible gas, the production well is returned to recovering oil.

Oil production becomes very inefficient when the rate of steam vapor production from a production well is too high (i.e. produced steam-oil ratio (PSOR) exceeds 5). Production well treatment may be more effective or more economical. A preferred production well treatment consists of coinjecting a mixture of (1) 100–150 barrels of steam, cold water equivalent per acre-foot of formation volume, at 60–80% quality; (2) a 1:1 mixture of CHASER SD1020 and polypeptide 10 and (3) nitrogen. The rate of injection of the aqueous surfactant-polypeptide solution depends on the rate and quality of steam, for example, 90–150 gallons of the aqueous surfactant-polypeptide solution is injected per 100 barrels of 60% quality steam, cold water equivalent. The rate of nitrogen injection is 4000 to 6000 SCF of nitrogen per 100 bbl of steam, cold water equivalent. After the production well has been treated, the well is returned to production of oil.

A similar situation happens in non-thermal (without steam) operations using a gas drive fluid such as a production light and intermediate gravity crude or carbon dioxide. In these cases, production becomes inefficient when gas production is too high compared to oil production rate (gas-oil ratio, GOR exceeds 3000 standard cubic feet of gas per stock tank barrel of oil). A similar production well treatment would be used, however, a noncondensible gas would be coinjected with the aqueous surfactant-polypeptide solution without coinjecting steam.

In still another embodiment of the production well treatment after steam breakthrough, a predetermined amount of steam is injected into the production well and thereafter steam and an aqueous surfactant-polypeptide solution are coinjected into the production well, followed by coinjecting a mixture of steam, an aqueous surfactant-polypeptide solution and a noncondensible gas into the production well. Thereafter the production well is shut in for 3 to 10 days and thereafter returned to production of oil.

The production well treatment after steam breakthrough may also include injecting alternate slugs of steam, aqueous surfactant-polypeptide solution and a noncondensible gas and mixtures thereof.

In one preferred embodiment of production well treatment after steam breakthrough, a slug of steam at 400° F., 250 psi and a quality of 60% is injected into the production well. The amount of steam injected is 780 BSPD-DWEB for 24 hours. The steam slug is followed by a second slug of steam at 400° F., 250 psi and a quality of 60%, coinjected with a slug of surfactant and polypeptide, preferably polypeptide 10, for a period of 24 hours. The steam is injected at the rate of 780 BSPD-CWEB, the surfactant at the rate of 55 gal./hr and the polypeptide at the rate of 5 gal./hr. Optionally, nitrogen may be coinjected with the mixture of steam, surfactant and polypeptide in the second slug at the rate of 24 SCFM for 24 hours. Thereafter, a third slug of steam at 400° F., 250 psi and a quality of 60% is coinjected with a surfactant, a polypeptide, and nitrogen. The third slug is injected for a period of 24 hours with the steam injected at the rate of 780 BSPD-CWEB, the surfactant at the rate of 55 gal./hr., the polypeptide at the rate of 5 gal./hr. and the nitrogen at the rate of 24 SCFM. After all the slugs have been injected the production well is returned to producing oil.

The foam-forming mixture of steam, noncondensible gas and aqueous surfactant-polypeptide solution or mixture of carbon dioxide and aqueous surfactant-polypeptide solution can bring about a substantial reduction in permeability when injected in the high permeability areas of the formation at almost any time. Conformance will be significantly improved whether the foam-forming mixture is injected into the formation at the very beginning of steam or carbon dioxide injection, before steam or carbon dioxide breakthrough at the production well, or after breakthrough. The most preferred injection times occur after the establishment of thermal communication between the injection well and the production well. In the first instance the injection of foam-forming mixture near the beginning of injection will help prevent narrow channels solution from being formed and being extended through to the production wells. The injection of the foam-forming mixture prior to breakthrough will postpone the time of breakthrough and spread the flooding medium over a wider area near the production wells.

In still another embodiment it may be desirable to coinject an aqueous surfactant-polypeptide solution with carbon dioxide in a non-thermal (without steam) flooding application. In this embodiment, carbon dioxide is initially injected into the formation via the injection well and fluids, including oil, are produced from the formation via the production well for a predetermined period of time, thereby forming a carbon dioxide swept zone in the formation or until there is carbon dioxide breakthrough at the production well. Thereafter, a mixture of carbon dioxide and an aqueous surfactant-polypeptide solution is injected into the formation via the injection well wherein the aqueous surfactant-polypeptide solution forms a stable foam in the carbon dioxide swept zone. At formation conditions of temperature and pressure, the stable foam significantly decreases the permeability of the carbon dioxide swept zone and diverts the carbon dioxide into other portions of the formation. Injection of the mixture of carbon dioxide and aqueous surfactant-polypeptide solution is continued and fluids including oil are recovered from the formation via the production well.

In the case of carbon dioxide flooding, the ratio of aqueous surfactant-polypeptide solution to carbon dioxide is about 15–40 gallons of solution per 1000 SCF of carbon dioxide and the ratio of surfactant to polypeptide in the aqueous surfactant-polypeptide solution is about 10:1 to 1:10.

The following examples will further illustrate the novel foam-forming mixtures of the present invention. These examples are given by way of illustration and not as limitations on the scope of the invention. Thus, it should be understood that the composition and concentration of the foaming agents may be varied to achieve similar results within the scope of the invention.

EXAMPLES

The following examples demonstrate how effective polypeptide is when used as a partial substitute to a steamfoam surfactant such as Chaser SD1020 (a toluene sulfonate).

Two sets of flow experiments were conducted with two types of porous media: the first set was conducted to evaluate the ability of the mixture to propagate and generate foam and to delay steam vapor or gas breakthrough. The second experiment was used to determine the ability of the foam generated by the surfactant-polypeptide mixture to divert steam and increase oil production.

The experiments were conducted in laboratory sandpacks using a typical California reservoir crude oil and steam generator feedwater. The experiments were conducted at simulated steamflood conditions of 400° F. and 320 psi.

Example 1

This example demonstrates that a polypeptide additive can be used, in steamfoam oil production processes, as a partial substitute to a surfactant resulting in lower surfactant concentration without reducing its effectiveness. The experiments were conducted in a 5 ft. long ×1.73 in diameter stainless steel pipe packed with quartz sand. The sandpack had a permeability of 8 darcies and a pore volume (PV) of 960 cc. It was filled with 860 cc of California heavy oil, 13 API gravity, and 100 cc of synthetic formation brine containing 10,000 parts per million total dissolved solids (ppm TDS). A typical run began by cleaning the sand by steamflooding, followed by the injection of brine, isopropyl alcohol (IPA), toluene, IPA, and finally, formation brine. The sandpack was then oil flooded to irreducible water saturation (Swir) and initial oil saturation (Soi). At that point the sandpack was steamflooded at a rate of 14 cc/min. (cold water equivalent basis) until steam breakthrough. At that point steam injection was stopped and 100 cc of liquid containing the desired concentration of surfactant-additive such as 1:1 mixture of Chaser SD 1020 and Polypeptide 10 mixture. Then nitrogen injection at a rate of 120 standard cc/min was started, steam injection was resumed, and surfactant or surfactant mixture injection was continued. Fluids produced and pressure drop along the pack were measured throughout the run. If the surfactant is a strong foamer, then its injection with steam and nitrogen will result in high pressure drop along the pack. The pressure drop was used to calculate the flow resistance of the foam, where flow resistance is defined as: flow resistance=Pressure Drop with foam/Pressure drop with steam.

Figure 3:
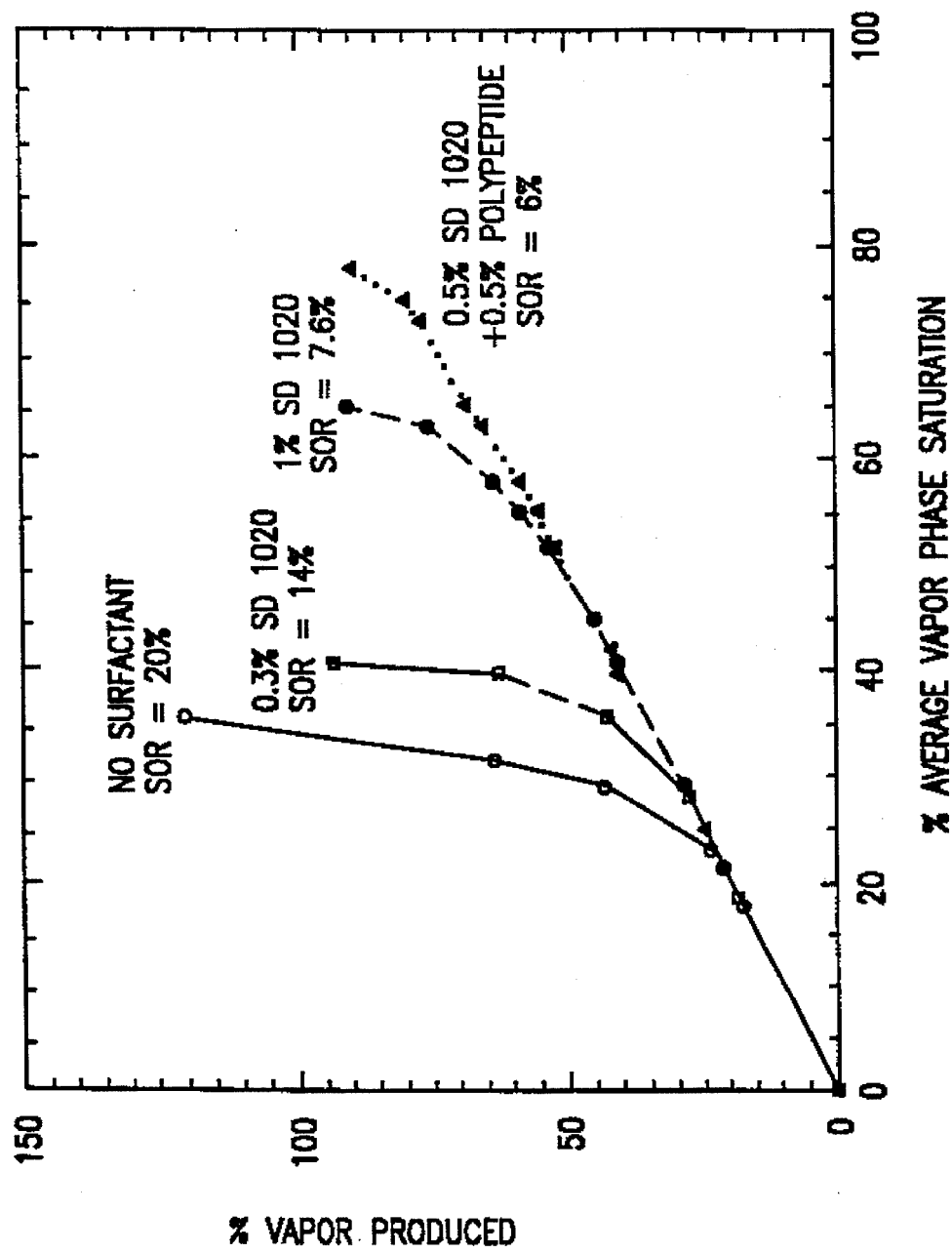
FIG. 3 shows the delays in steam breakthrough from a laboratory sand pack during injections of steam-foam-forming mixtures; into and through the sand pack.

Linear toluene sulfonate surfactants are widely used in steamfoam field operations. One such surfactant is marketed by Chaser International Inc. as Chaser SD1020. It has an average carbon chain length between 20-24 with very narrow molecular weight distribution. FIG. 3 demonstrates that in unidirectional laboratory sand packs, a mixture containing 0.5% CHASER SD 1020 and 0.5% polypeptide performs better than 1% SD 1020. It delays gas breakthrough from 50% gas saturation to more than 70% gas saturation.

Example 2

This example is used to demonstrate that the flow diversion ability of the 0.35% CHASER SD1020+0.35% polypeptide is equivalent to that of the 1% CHASER SD1020. In this example, the sandpack is 3 ft. long ×1.73 in diameter. The tube is packed with sand of different permeabilities (i.e. 19 darcies on side 1 and 2.5 darcies on side 2). The fluids are injected through the inlet, located in the middle of the pack and are produced from the outlets, on both sides of the pack. Initially the sandpack contained 475 cc California heavy oil and 55 cc of synthetic formation brine.

Figure 4:
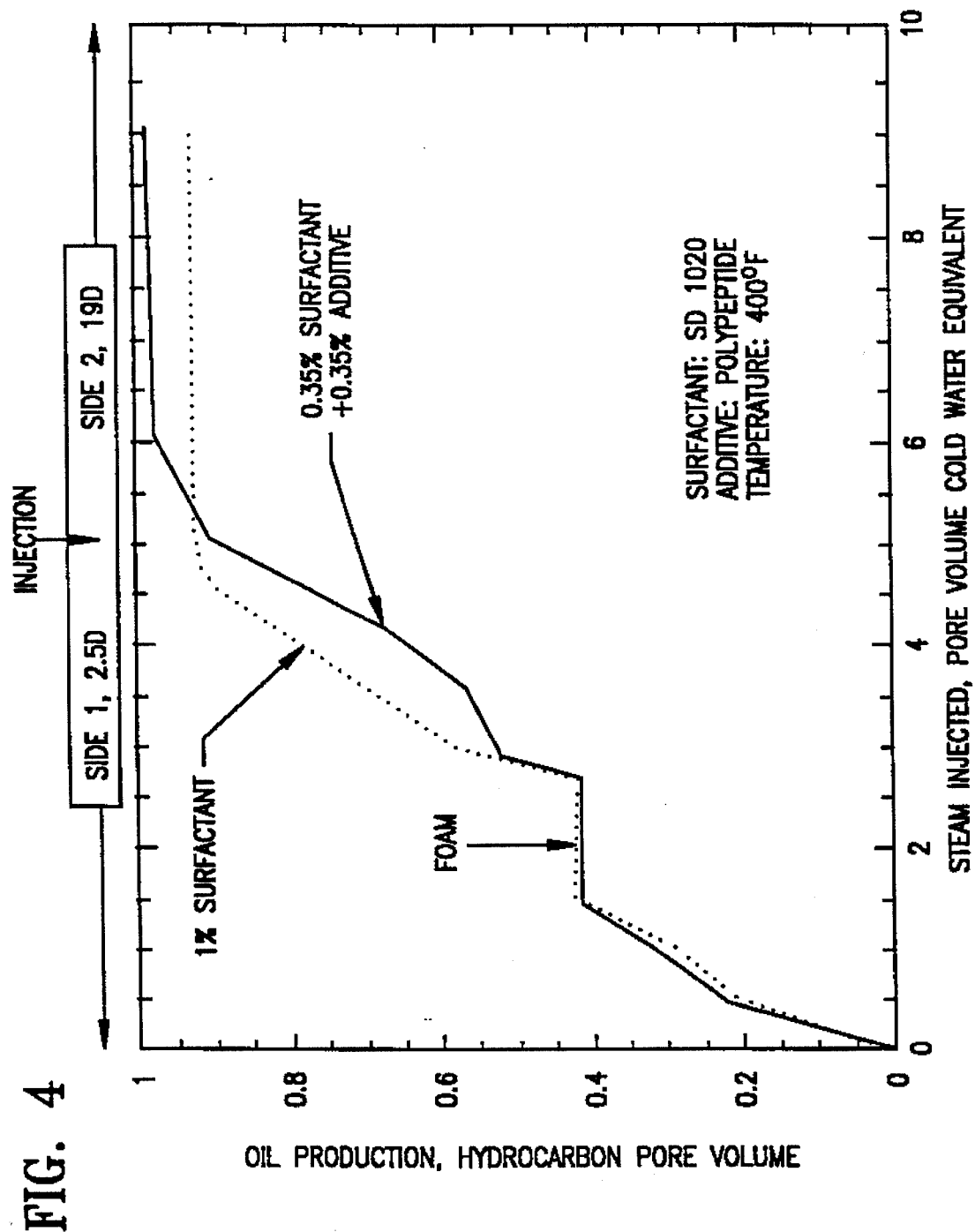
FIG. 4 shows the amount of oil produced from a laboratory sand pack during injections of steam-foam-forming mixtures into and through the sand pack.

Initially steam was injected at a rate of 8.5 cc/min. CWEB, and allowed to follow its path resulting in the production of oil from the more permeable side. Steam injection was continued until it broke through from the more permeable side, and no significant oil production was observed as shown in FIG. 4. At that point, steam injection was stopped-temporarily and 50 cc. of brine containing 1% by weight active CHASER SD1020 was injected. Then nitrogen was injected at 120 standard cc/min. steam injection was resumed, and surfactant injection was continued. This resulted in the generation of foam in the more permeable side and the diversion of steam to the less permeable side increasing oil production from 42% to 92% of the hydrocarbon pore volume. It is important to note that foam was also generated in the less permeable side but the high oil saturation rendered the foam weaker and ineffective.

This experiment was repeated with 0.35% CHASER SD1020+0.35% polypeptide. The results, also shown in FIG. 4, demonstrate that the foam generated by the surfactadditive mixture was as effective as the 1% surfactant solution by increasing oil production from 40% to 98% of the hydrocarbon pore volume.

As shown by the above examples, the steam-foam-forming surfactant/polypeptide mixture of the present invention produces stronger and more economical foams.

By the term "pore volume" as used herein, is meant that the volume of the portion of the formation underlying the well pattern employed as described in greater detail in U.S. Pat. No. 3,927,716 to Burdyn et al, the disclosure of which is hereby incorporated by reference.

While the invention has been described in terms of a single injection well and a single spaced apart production well, the method according to the invention may be practiced using a variety of well patterns. Any other number of wells, which may be arranged according to any pattern, may be applied in using the present method as illustrated in U.S. Pat. No. 3,927,716 to Burdyn et al. Preferably, the injection wells and production wells are operated in a plurality of five-spot patterns. In this embodiment, during treating of a production well that has experienced severe steam breakthrough, the driving fluid such as steam is continuously injected into the formation via the central injection well and oil is recovered from the surrounding production wells. After treatment of the production well, that well is returned to production.

From the foregoing specification one skilled in the art can readily ascertain the essential features of this invention and without departing from the spirit and scope thereof can adapt it to various diverse applications. It is our intention and desire that our invention be limited only by those restrictions or limitations as are contained in the claims appended immediately herein after below.

What is claimed is:

1. A method for recovering oil from a subterranean, oil-containing formation penetrated by at least one injection well and at least one spaced-apart production well, said wells being in fluid communication with a substantial portion of the formation, comprising:

(a) injecting carbon dioxide into the formation via the injection well and producing fluids including oil from the formation via the production well for a predetermined period of time, thereby forming a carbon dioxide-swept zone in the formation;

(b) thereafter injecting a mixture of carbon dioxide and an aqueous surfactant-polypeptide solution into the formation via the injection well, said aqueous surfactant-polypeptide solution capable of forming a stable foam in the carbon dioxide-swept zone at formation conditions of temperature and pressure thereby significantly decreasing the permeability of that zone and diverting the carbon dioxide, into other portions of the formation; and (c) continuing to inject said mixture of carbon dioxide and aqueous surfactant-polypeptide solution and recovering fluids including oil from the formation via the production well.

2. The method of claim 1 wherein step (a) is continued until carbon dioxide appears at the production well.

3. The method of claim 1 wherein in step (b) 15–40 gallons of aqueous surfactant-polypeptide solution per 1000

SCF of carbon dioxide is injected into the formation and the ratio of surfactant to polypeptide in the aqueous surfactant-polypeptide solution is about 1:10 to 10:1.

4. The method of claim 3 wherein the ratio of surfactant and polypeptide in the solution is about 1:1.

5. The method of claim 1 wherein the surfactant is selected from the group consisting of sodium or ammonium salts of ethoxylated sulfated alcohols and linear alcohol ethoxylates.

6. The method of claim 1 wherein the polypeptide comprises wheat, rice, pea and soybean-based polypeptides.

7. The method of claim 1 wherein the surfactant comprises linear toluene sulfonates.

8. The method of claim 1 wherein said mixture is injected into an injection well immediately prior to carbon dioxide breakthrough at a production well.

9. The method of claim 1 further comprising the injection of carbon dioxide into the injection well after injection of the mixture of carbon dioxide and aqueous surfactant-polypeptide solution.

10. In a carbon dioxide flood in a subterranean, oil-containing formation, the improvement which comprises:
   (a) injecting into an injection well a mixture of carbon dioxide and an aqueous surfactant-polypeptide solution which will foam and reduce the permeability of swept zones, forcing carbon dioxide into unswept areas of the formation; and
   (b) injecting carbon dioxide into the injection well.

11. The method of claim 10 wherein in step (a) 15–40 gallons of aqueous surfactant-polypeptide solution per 1000 SCF of carbon dioxide is injected into the formation and the ratio of surfactant to polypeptide in the aqueous surfactant-polypeptide solution is about 1:10 to 10:1.

12. The method of claim 11 wherein the ratio of surfactant to polypeptide in the aqueous surfactant-polypeptide solution is about 1:1.

13. The method of claim 10 wherein the surfactant is selected from the group consisting of sodium or ammonium salts of ethoxylated sulfated alcohols and linear alcohol ethoxylates.

14. The method of claim 10 wherein the polypeptide comprises wheat, soybean, rice, and pea-based polypeptides.

15. The method of claim 10 wherein the surfactant comprises ammonium salts of ethoxylated sulfated alcohol.

16. A method for recovering oil from a subterranean, oil-containing formation penetrated by at least one injection well and at least one spaced apart production well, said wells being in fluid communication with a substantial portion of the formation, comprising:
   (a) injecting a noncondensible gas into the formation via the injection well and recovering fluids including oil from the formation via the production well until the fluids recovered from the production well contain an unfavorable amount of gas;
   (b) injecting an aqueous surfactant-polypeptide solution into the production well;
   (c) coinjecting a mixture of noncondensible gas and aqueous surfactant-polypeptide solution into the production well;
   (d) discontinuing injection of noncondensible gas and continuing the injection of aqueous surfactant-polypeptide solution into the production well;
   (e) coinjecting a mixture of noncondensible gas and an aqueous surfactant-polypeptide solution into the production well;
   (f) discontinuing injection of noncondensible gas and continuing the injection of an aqueous surfactant-polypeptide solution into the production well;
   (g) shutting-in the production well for 3–10 days, and
   (h) producing fluids including oil from the formation via the production well.

17. The method of claim 16 wherein the ratio of surfactant to polypeptide is about 10:1 to 1:10.

18. The method of claim 16 wherein the noncondensible gas is selected from the group consisting of nitrogen, carbon dioxide, flue gas, natural gas, methane, ethane, carbon monoxide, or a mixture thereof.

19. The method of claim 16 wherein the surfactant is selected from the group consisting of sodium or ammonium salts of ethoxylated sulfated alcohols and linear alcohol ethoxylates.

20. The method of claim 16 wherein the polypeptide comprises soybean protein.

21. The method of claim 16 wherein in steps (b), (d) and (f) the amount of aqueous surfactant-polypeptide solution injected into the formation is 100–150 barrels pre one-foot of formation.

22. The method of claim 16 wherein in steps (c) and (e) the ratio of noncondensible gas to aqueous surfactant-polypeptide solution is 4000–6000 SCF of gas per 100 barrels of solution.

* * * * *